UNITED STATES PATENT OFFICE.

ARTHUR TOWNE, OF PHILADELPHIA, PENNSYLVANIA, ASSIGNOR TO HIMSELF AND AXEL H. BICKNELL, OF BOSTON, MASSACHUSETTS.

IMPROVEMENT IN BRONZING COMPOUNDS.

Specification forming part of Letters Patent No. 132,993, dated November 12, 1872.

*To all whom it may concern:*

Be it known that I, ARTHUR TOWNE, of the city and county of Philadelphia, State of Pennsylvania, have invented an Improved Liquid Bronzing Compound; and I hereby declare the following to be a full, clear, and exact description thereof.

My invention has for its object to provide a bronzing compound which will dry properly and still have a great amount of adherence to the object to which it is applied, and it is an improvement on the compound secured to me in Letters Patent No. 104,665, dated June 21, 1870; and consists in adding a drying compound to the said patented compound.

I take one ounce of litharge, one-quarter of a pint of linseed-oil, and one pound of balsam of fir, and mix them. This mixture is then reduced with spirits of turpentine to a proper consistency to be applied with an ordinary varnish-brush. Bronzing material is then added, and the compound is ready for use.

I do not claim metallic powders mixed with a solution of the polishing gums in ether and ammonia; but

What I claim as my invention, and desire to secure by Letters Patent, is—

A bronzing compound, consisting of balsam of fir, spirits of turpentine, linseed-oil, litharge, and bronzing-powder, as described.

ARTHUR TOWNE.

Witnesses:
JOHN PITTS,
J. C. SCHANCK.